No. 625,100. Patented May 16, 1899.
J. B. ENTZ.
SYSTEM OF ELECTRICAL DISTRIBUTION.
(Application filed Feb. 6, 1899.)
(No Model.)
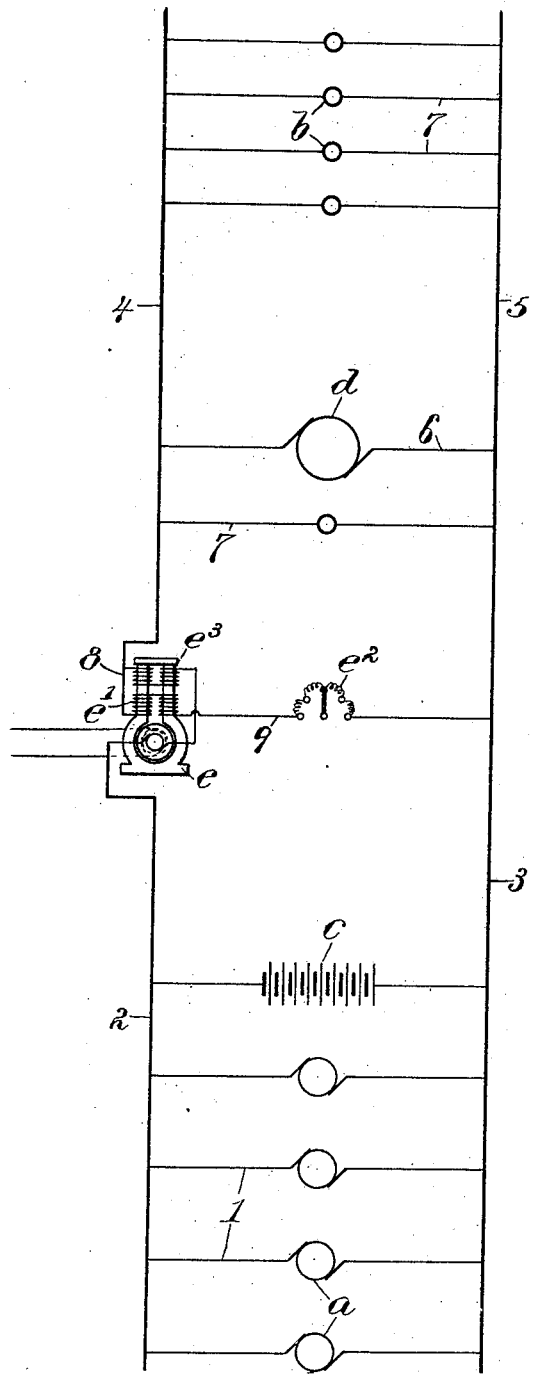

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF NEW JERSEY.

SYSTEM OF ELECTRICAL DISTRIBUTION.

SPECIFICATION forming part of Letters Patent No. 625,100, dated May 16, 1899.

Application filed February 6, 1899. Serial No. 704,628. (No model.)

*To all whom it may concern:*

Be it known that I, JUSTUS B. ENTZ, a citizen of the United States, residing at the city of Philadelphia, in the county of Philadelphia and State of Pennsylvania, have invented a certain new and useful System of Electrical Distribution, of which the following is a specification.

One object of this invention is to supply circuits subjected to fluctuations of load and keep the load on the generator or generators constant, whereby other circuits supplying translating devices requiring substantially constant voltage for their practical operation may, if desired, be satisfactorily and successfully supplied from the same generator or generators.

Another object of the invention is to confine variations in load or voltage to a circuit supplied from a generator or generators in such manner that such variations shall not react upon the generator.

To these and other ends my invention comprises the improvements hereinafter described and claimed.

The nature, characteristic features, and scope of the invention will be more fully understood from the following description, taken in connection with the accompanying drawing, forming part hereof, and in which I have illustrated diagrammatically a system of distribution of my invention.

In the drawing the circuit 1 2 3 is a circuit of varying load. Many such circuits occur in the arts; but for the sake of description I will assume that it is a circuit which supplies current to the motors $a$, that operate electric elevators, although it must be borne in mind that it may be a circuit of any kind that is subjected to fluctuations of load.

4 5 6 7 is a circuit of constant potential or voltage, such as is frequently encountered in the arts. For the sake of description I will assume it to be a circuit supplying incandescent lamps $b$, that may be used to light the building in which the motors $a$ operate the elevators, although it must be borne in mind that this circuit may be used for other purposes where constant voltage is desirable. $c$ is a regulating-battery arranged across the leads 2 3 of the circuit, and $d$ is a generator or generators which supplies current for the system and is in parallel with the battery. Fluctuations of load upon the circuit 2 3, or in the present instance upon the elevator-motors $a$, cause the battery to charge and discharge, thus varying the voltage or potential of the circuit 2 3. To keep the voltage or potential of the circuit 4 5 constant is one of the features of the invention, and at the same time it is necessary to charge the battery $c$ from the generator $d$. To do this, a predetermined amount of current is supplied at all times during operation to the battery $c$ from the generator $d$. Since charge and discharge of the battery $c$ in respect to the circuit 2 3 vary its voltage, it follows that means must be provided for keeping constant the amount of current delivered from the generator $d$ to the battery. These means comprise a dynamo-electric machine $e$, operated at approximately uniform speed and having a constantly-excited field-winding $e'$, which tends to produce in the armature of the machine $e$ a voltage which will cause current to pass from the circuit 4 5 of constant potential to the circuit 2 3 of varying potential. This machine is sometimes hereinafter referred to as a "booster." As shown, this field $e'$ is constantly excited by way of conductors 8 9, in which there may be interposed a rheostat $e^2$ for purposes of adjustment. The machine $e$ is also provided with a series field $e^3$, opposing the constantly-excited field $e'$, so that when the current through the series field reaches the predetermined value which corresponds to the current that is to be constantly supplied to the battery it neutralizes the effect of the constantly-excited field $e'$ and prevents increase in current by reversing the polarity of the dynamo-electric machine $e$, and thus tends to cause current to flow in the opposite direction. As shown, the series field $e^3$ is interposed in one of the leads. For the sake of explanation it may be assumed that no current is being used in the circuit 2 3 and that the apparatus is designed to supply at all times a practically constant current to the battery $c$. Under these circumstances the battery $c$ is being charged by the generator $d$. Its voltage therefore tends to rise, which would have the effect to diminish the predetermined constant current. However, the effect of this tendency toward decreased current is to weaken the series coil $e^3$ and thereby diminish its opposing effect upon the constantly-excited coil $e'$, and thus cause the booster $e$ to build up in voltage sufficiently to offset the rise in voltage of the battery in charging and to, as it were, drive enough current to the battery to insure the delivery thereto of practically the predetermined current. Should a sudden and considerable demand be made upon the circuit 2 3 or upon the elevator-motors therein, the battery $c$ will tend to discharge, and therefore to decrease in voltage. This change in voltage would, if unrestrained, cause current in excess of the predetermined quantity to pass from the machine $d$ to the battery $c$; but the change in current also causes the series coil $e^3$ to increase in strength, thereby opposing in greater degree the constantly-excited coil $e'$, and thus causing the booster to decrease or reverse in voltage sufficiently to compensate for the fall in voltage of the battery and to prevent the passage of such excess of current from the generator $d$ to the battery. For the sake of explanation I may say that the differentially-wound booster $e$ coöperates with the rest of the described system to automatically prevent more or less than a predetermined quantity of current within narrow limits from passing from the generator to the battery, so that fluctuations in load on the circuit 2 3 are confined to the battery and may not react upon the generator. The cause which results in this operation of the booster is that a change in current through the booster automatically effects a change of voltage of the booster, which resists the change of current, whereby a change of relative voltage between the generator $d$ and battery $c$, which would otherwise cause a great change or even reversal of current flowing between the two, is limited to a comparatively small amount.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. The combination in a system of electrical distribution, of, a working circuit, a generator and a battery each arranged across the leads thereof, and a differentially-wound dynamo-electric machine interposed in the circuit between the generator and battery, substantially as described.

2. Means for causing a practically-constant rate of current to flow between circuits between which there is a varying difference in voltage which comprise a dynamo-electric machine interposed between said circuits and having a constantly-excited field and a series field opposing the constantly-excited field, substantially as and for the purposes described.

In testimony whereof I have hereunto signed my name in the presence of two witnesses.

JUSTUS B. ENTZ.

Witnesses:
 ALFRED J. WILKINSON,
 W. F. JACKSON.